United States Patent [19]

Hall

[11] Patent Number: 5,933,272

[45] Date of Patent: Aug. 3, 1999

[54] DUAL FIELD OF VIEW AFOCAL

[75] Inventor: John M. Hall, Alexandria, Va.

[73] Assignee: The United States of America as represented by the Secretary of the Army, Washington, D.C.

[21] Appl. No.: 09/084,873

[22] Filed: May 28, 1998

[51] Int. Cl.⁶ .................................................. G02B 13/14
[52] U.S. Cl. ........................ 359/357; 359/355; 359/796
[58] Field of Search ..................... 359/355, 356, 359/357, 362, 744; 250/332, 334

[56] References Cited

U.S. PATENT DOCUMENTS 4,479,695  10/1984  Neil ......................................... 359/744
5,504,628  4/1996  Borchard ................................. 359/365

*Primary Examiner*—Thong Nguyen
*Assistant Examiner*—Fayez Assaf
*Attorney, Agent, or Firm*—Milton W. Lee; John E. Holford; Alain L. Bashore

[57] ABSTRACT

An infrared afocal lens assembly for providing an observed magnified IR image scene with a field of view and a substantially less temperature dependent performance. The assembly includes a collecting lens, focusing lens subassembly, an intermediate focal plane, an eyepiece lens subassembly, and an aperture stop. A wide field of view lens subassembly may be used about the focusing lens subassembly. All lenses are made of either GaAs or ZnS, and all lenses are either single lens or doublets.

6 Claims, 4 Drawing Sheets

DUAL FIELD OF VIEW AFOCAL

BACKGROUND OF THE INVENTION

1. Field of the Invention

The present invention generally relates to IR (infrared) afocal lens assemblies and more specifically, to a dual field of view IR afocal assembly with substantially lens temperature independent performance.

2. Description of Prior Art

The purpose of an Afocal lens assembly is to collect collimated (plane wave) infra-red light, focus the rays in an image plane, and re-collimate the light through an exterior exit pupil. IR Afocals are in common use today in both military and industrial sensor systems. The design of each imager is constrained by the desired field of view, resolution, and size allocated by the system designer. One of the most widely used optical materials for use in IR optical design is germanium, which has a very high index of refraction (n=4.0), high optical transmission, and a relatively low color dispersion. For many compact IR sensor systems, germanium is one of the preferred materials that allows high performance with reduced complexity and affordable cost. Unfortunately, germanium also undergoes dramatic changes in transmission and index of refraction as temperature rises over 50° C. Depending on the total amount of germanium in a given system, system performance can degrade rapidly in high temperature environments. The degradation includes a reduction in optical transmission due to the increased absorption, and a drastic change in optical power as the index of refraction changes with temperature.

While the prior art has reported using afocal lens assemblies none have established a basis for a specific assembly that is dedicated to the task of resolving the particular problem at hand. What is needed in this instance is a non-germanium infrared (IR) afocal lens assembly with substantially less temperature dependent performance.

SUMMARY OF THE INVENTION

It is therefore one object of the invention to provide an infrared (IR) afocal lens assembly with substantially less temperature dependent performance.

According to the invention, there is disclosed an infrared (IR) afocal lens assembly for providing an observed magnified IR image scene with alternative field of view and a substantially lens temperature independent performance. A GaAs meniscus lens collects IR input light which is input to a focusing lens subassembly. The focusing lens assembly includes one doublet comprising a focusing single GaAs lens and one focusing single 0.40 cm thick ZnS lens. A wide field of view (WFOV) lens subassembly may be optionally insertable onto the optical axis about the focusing lens subassembly for providing a WFOV. The WFOV lens subassembly includes one doublet comprising two WFOV single GaAs lenses in front of said focusing lens subassembly, and one WFOV single lens comprising a ZnS lens behind said focusing lens subassembly. An intermediate focal plane on the optical axis provides a accessible intermediate focus. An eyepiece lens collimates the intermediate focus and provides an external exit pupil. The eyepiece lens subassembly includes one single GaAs lens and one doublet comprising a single ZnS lens and one GaAs lens. An aperture stop on the optical axis defines the location of the exit pupil.

Substantially no change in index of refraction and absorption occurs with moderate increase in lens temperatures, and such that a narrow field of view (NFOV) of an IR image is observed magnified through the IR afocal lens assembly. When said WFOV lens subassembly is used a WFOV of an IR scene is observed through the IR afocal lens assembly.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
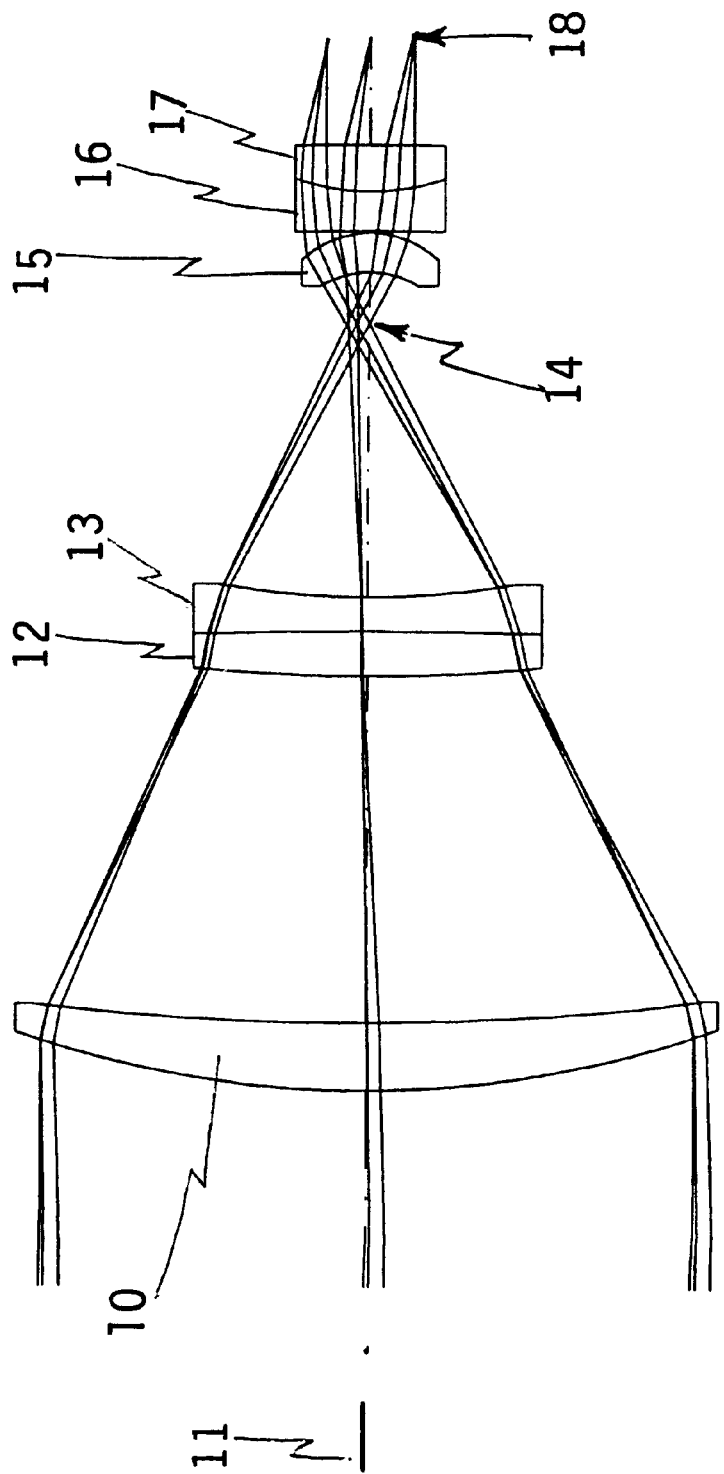
FIG. 1 is the optical layout diagram for the Narrow Field of View (NFOV) configuration of the present invention.

Referring now to the drawings, and more particularly to FIG. 1, there is shown the optical layout diagram for the Narrow Field of View (NFOV) configuration of the present invention. Lens element 10 on optical axis 11 is a meniscus lens with two positive curvatures and is made of GaAs. The front curvature of lens element 10 is aspheric, which follows the polynomial equation for general aspheres. A doublet containing lens element 12 and 13 are present, where lens element 12 is a positive lens made of GaAs and lens 13 is a negative lens made of ZnS with an asphere on the back surface. Intermediate focal plane 14 provides relatively good spot size over most of the FOV and can be used for optical power limiting devices. Lens elements 15, 16, and 17 form the "eyepiece" section of the afocal. The "eyepiece" collimates the focused beam and provides an external exit pupil. Lens 15 is a positive meniscus lens made of GaAs. It is followed by a doublet containing Lenses 16 and 17. Lens 16 is a weak meniscus lens made of ZnS. Lens 17 is a positive lens made of GaAs; its back curvature is aspheric. The afocal is shown with a "dummy" imager of focal length 1.875". This is used in the MTF calculations and in the reporting of an overall system focal length of 13.75".

Figure 2:
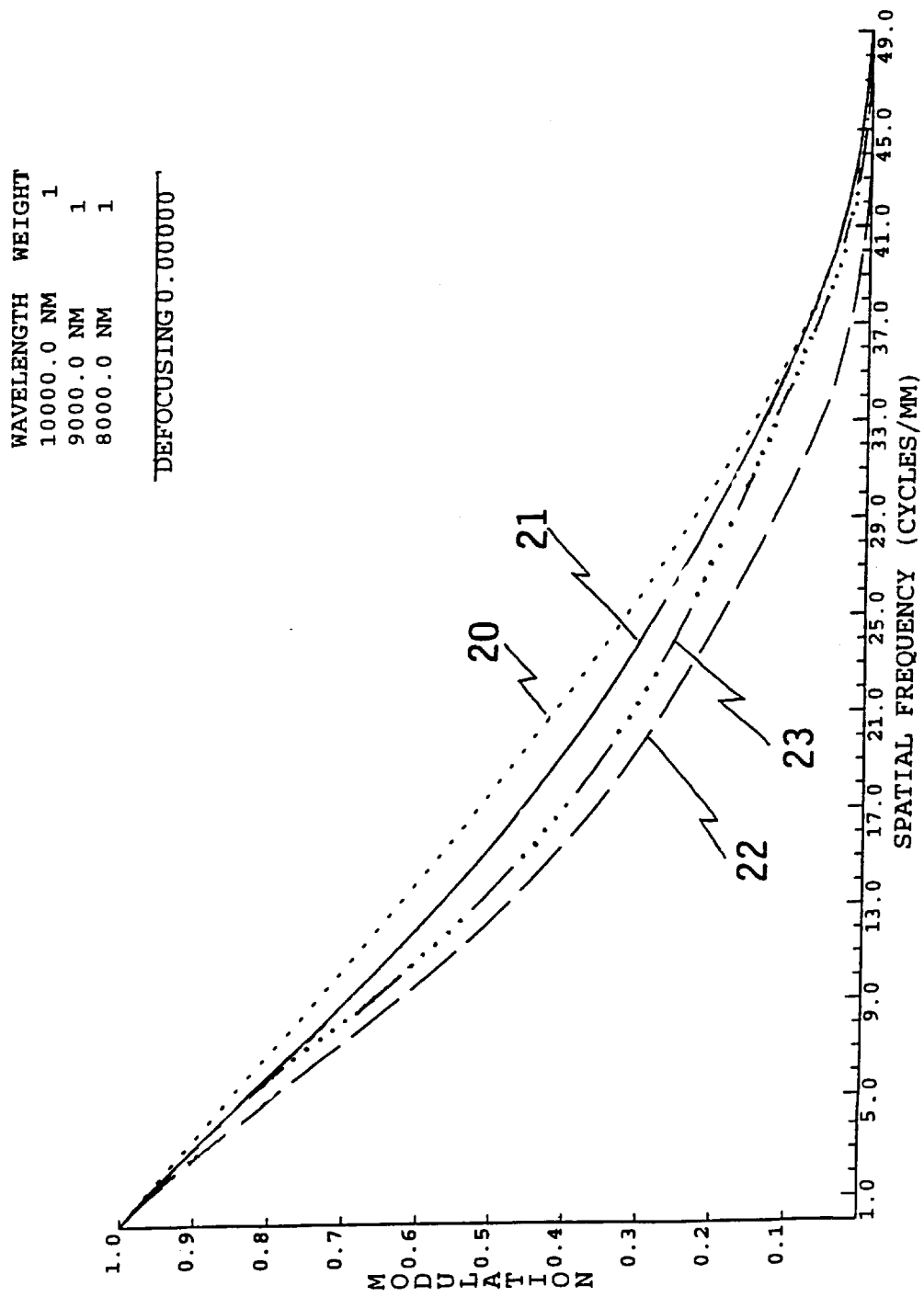
FIG. 2 is the Modulation Transfer Function (MTF) Resolution Performance graph for the NFOV configuration of FIG. 1.

FIG. 2 is the Modulation Transfer Function (MTF) Resolution Performance graph for the NFOV configuration of FIG. 1. One of the performance measurements of the assembly is its resolution represented as the on-axis MTF at zero degrees FOV and the off-axis MTF at the maximum FOV. Line 20 is the diffraction limit and line 21 is the on-axis MTF. Lines 22 and 23 represent the tangential and sagittal components of the maximum FOV (1.0 field at 1.80 degree) respectively. As seen from FIG. 2 the MTF on-axis yields high resolution at approximately 30% at 22 cycles/mm.

Figure 3:
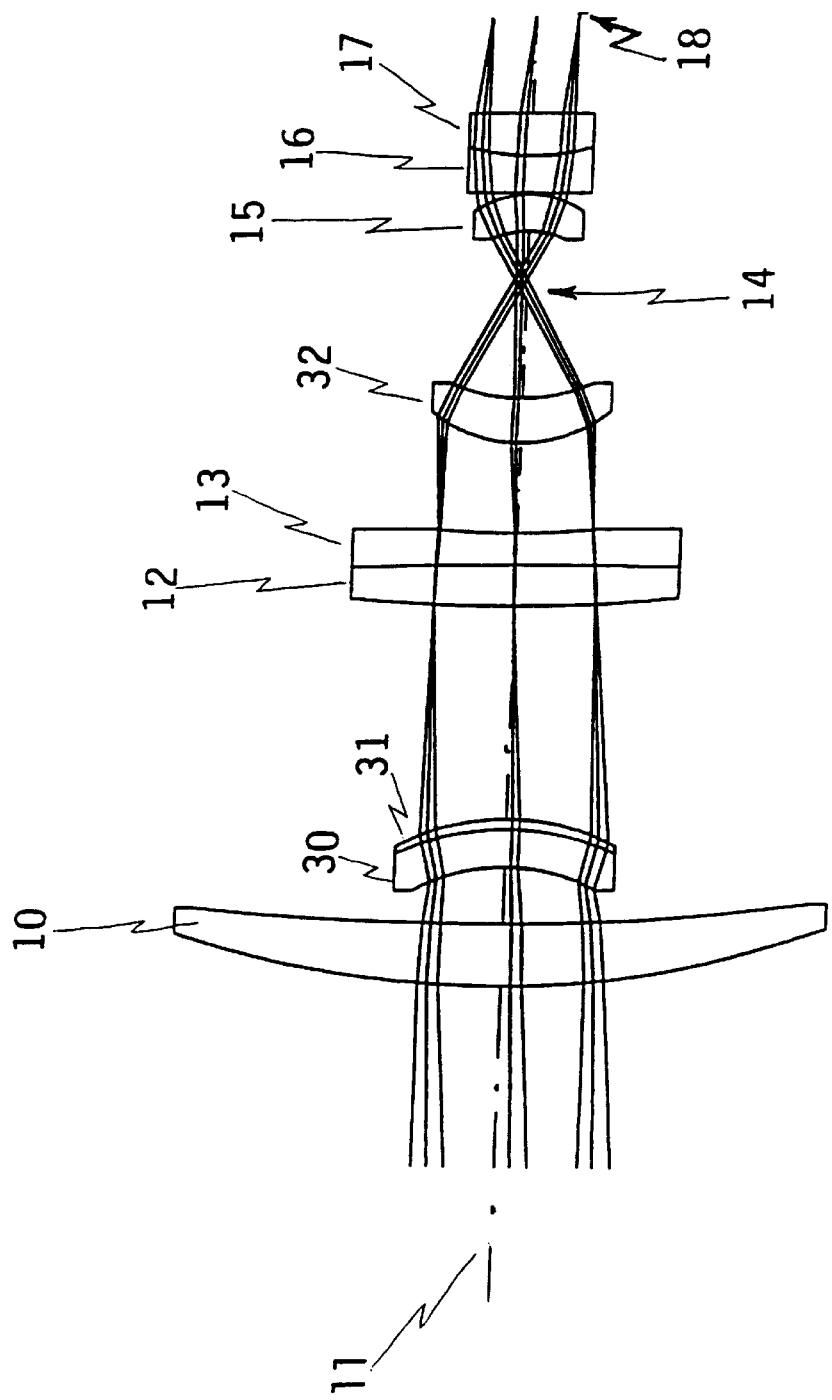
FIG. 3 is the optical layout diagram for the Wide Field of View (WFOV) configuration of the present invention.

FIG. 3 shows the optical layout diagram for the Wide Field of View (WFOV) configuration of the present invention. Lens element 10 on optical axis 11 of FIG. 1 is a meniscus lens with two positive curvatures and is made of GaAs. The front curvature of lens element 10 is aspheric, which follows the polynomial equation for general aspheres. Lens elements 30 and 31 of FIG. 3 form a doublet where lens 30 is a reverse meniscus lens with two negative curvatures and lens 31 is another meniscus lens with two negative curvatures made of ZnS. Lens element 31 is bonded with lens element 30 to help maintain color and astigmatism correction. The back curvature of Lens 31 is aspheric. A second doublet containing lens element 12 and 13 of FIG. 1 are also present, where lens element 12 is a positive lens made of GaAs and lens 13 is a negative lens made of ZnS with an asphere on the back surface. Lens 32 of FIG. 3 is a meniscus lens made of GaAs with aspheric curvatures on both sides. Intermediate focal plane 14 of FIG. 1 provides relatively good spot size over most of the FOV and can be used for optical power limiting devices. Lens elements 15, 16, and 17 form the "eyepiece" section of the afocal. The "eyepiece" collimates the focused beam and provides an external exit pupil. Lens 15 is a positive meniscus lens made of GaAs. It is followed by a doublet containing Lenses 16 and 17. Lens 16 is a weak meniscus lens made of ZnS. Lens 17 is a positive lens made of GaAs; its back curvature is aspheric. Here again a "dummy" imager of focal length 1.875" is used for MTF calculation and in the description of the system focal length of 3.67".

Figure 4:
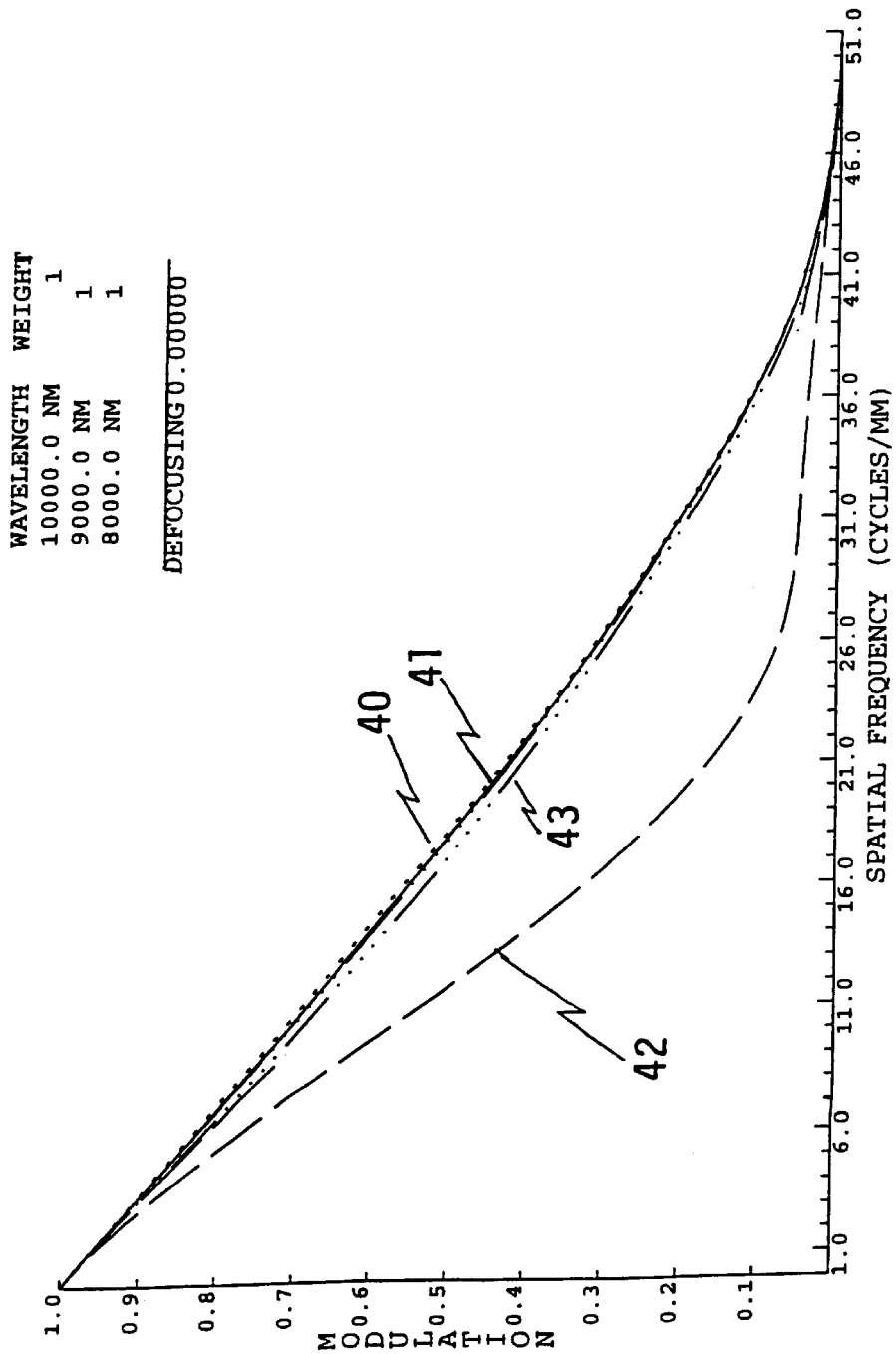
FIG. 4 is the Modulation Transfer Function (MTF) Resolution Performance graph for the WFOV configuration of FIG. 3.

FIG. 4 is the Modulation Transfer Function (MTF) Resolution Performance graph for the WFOV configuration of FIG. 3. One of the performance measurements of the assembly is its resolution represented as the on-axis MTF at zero degrees FOV and the off-axis MTF at the maximum FOV. Line 40 is the diffraction limit and line 41 is the on-axis MTF. Lines 42 and 43 represent the tangential and sagittal components of the maximum FOV (1.0 field at 3.80 degrees) respectively. As seen from FIG. 4 the MTF on-axis yields high resolution at approximately 33% at 22 cycles/mm.

TABLE 1 and TABLE 2 are the fabrication data for the IR Afocal optical design for the NFOV and WFOV configurations of FIGS. 1 and 2 respectively. All dimensions are given in inches, where each lens element is described in terms of radius of curvature for front and back of each lens, and CC denotes concave and CX denotes convex. A "dummy" imager is inserted after the afocal exit pupil in order to evaluate image quality. For this reason, the fabrication data listed in TABLE 1 and TABLE 2 will list infinite conjugates such as effective focal length (EFL) and F# (FNO) which are based upon an arbitrary "dummy" imager focal length. Image diameter shown in TABLE 1 is a paraxial value, it is not a ray trace, and thickness is axial distance to next surface. The reference wavelength is 10,000.0 nm for the spectral region of 8000.0 to 10,000.0 nm range.

TABLE ONE

| ELEMENT NUMBER | RADIUS OF CURVATURE FRONT | BACK | THICKNESS | APERTURE DIAMETER FRONT | BACK | GLASS |
|---|---|---|---|---|---|---|
| OBJECT |  | INF | INFINITY |  |  |  |
|  |  |  |  |  | 5.7748 |  |
|  |  |  | 0.5000 |  |  |  |
| 10 | A(1) | 23.3258 CC | 0.5633 | 5.7137 | 5.5907 | 'gaas' |
|  |  |  | 0.5125 |  |  |  |
|  |  |  |  |  | 5.2193 |  |
|  |  |  | 0.3390 |  |  |  |
|  |  |  |  |  | 4.8536 |  |
|  |  |  | 0.0935 |  |  |  |
|  |  |  |  |  | 4.7528 |  |
|  |  |  | 0.0050 |  |  |  |
|  |  |  |  |  | 4.7474 |  |
|  |  |  | 1.9451 |  |  |  |
| 12 | 15.0136 CX | −59.2340 CX | 0.3740 | 2.8059 | 2.6909 | 'gaas' |
| 13 | −59.2340 CC | A(2) | 0.2851 | 2.6909 | 2.4386 | ZNS |
|  |  |  | 0.8152 |  |  |  |
|  |  |  |  |  | 1.7675 |  |
|  |  |  | 0.4049 |  |  |  |
|  |  |  |  |  | 1.3875 |  |
|  |  |  | 1.5000 |  |  |  |
| 15 | −0.8112 CC | −0.8517 CX | 0.3296 | 0.7977 | 1.0763 | 'gaas' |
|  |  |  | 0.0155 |  |  |  |
| 16 | −32.4868 CC | 1.9504 CC | 0.3297 | 1.1253 | 1.1799 | ZNS |
| 17 | 1.9504 CX | A(3) | 0.3874 | 1.1799 | 1.1447 | 'gaas' |
|  |  |  | 0.9000 |  |  |  |
|  |  |  | APERTURE STOP |  | 0.7488 |  |
|  | IMAGE DISTANCE = | | 1.8750 |  |  |  |
| IMAGE |  | INF |  |  | 0.8645 |  |

TABLE TWO

| ELEMENT NUMBER | RADIUS OF CURVATURE FRONT | BACK | THICKNESS | APERTURE DIAMETER FRONT | BACK | GLASS |
|---|---|---|---|---|---|---|
| OBJECT |  | INF | INFINITY |  |  |  |
|  |  |  |  |  | 1.9388 |  |
|  |  |  | 0.5000 |  |  |  |

TABLE TWO-continued

| ELEMENT NUMBER | RADIUS OF CURVATURE FRONT | BACK | THICKNESS | APERTURE DIAMETER FRONT | BACK | GLASS |
|---|---|---|---|---|---|---|
| 10 | A(4) | 23.3258 CC | 0.5633 | 1.8657 | 1.7649 | 'gaas' |
|  |  |  | 0.5125 |  |  |  |
| 30 | −1.7516 CC | −2.376S CX | 0.3390 | 1.6295 | 1.8369 | 'gaas' |
| 31 | −2.3765 CC | A(5) | 0.0935 | 1.8369 | 1.8657 | ZNS |
|  |  |  | 0.0050 |  |  |  |
|  |  |  |  |  | 1.8262 |  |
|  |  |  | 1.9451 |  |  |  |
| 12 | 15.0136 CX | −59.2340 CX | 0.3740 | 1.4759 | 1.4343 | 'gaas' |
| 13 | −59.2340 CC | A(6) | 0.2851 | 1.4343 | 1.4118 | ZNS |
|  |  |  | 0.8152 |  |  |  |
| 32 | A(7) | 1.5739 CC | 0.4049 | 1.5042 | 1.2405 | 'gaas' |
|  |  |  | 1.5000 |  |  |  |
| 15 | −0.8112 CC | −0.8517 CX | 0.3296 | 0.6472 | 0.9027 | 'gaas' |
|  |  |  | 0.0155 |  |  |  |
| 16 | −32.4868 CC | 1.9504 CC | 0.3297 | 0.9541 | 1.0258 | ZNS |
| 17 | 1.9504 CX | A(8) | 0.3874 | 1.0258 | 1.0071 | 'gaas' |
|  |  |  | 0.9000 |  |  |  |
|  |  | APERTURE STOP |  |  | 0.7658 |  |
|  | IMAGE DISTANCE = | 1.8750 |  |  |  |  |
| IMAGE |  | INF |  |  | 0.4875 |  |

Surfaces given in TABLE 1 and TABLE 2 as A( ) denote aspheric surfaces governed by the following equation:

$$\frac{(CURV)Y^2}{1+\{1-(l+K)(CURV)^2Y^2\}^{1/2}} *(A)Y^4+(B)Y^6+(C)Y^8*(D)Y^{10}$$

whereby the aspheric constants are listed in TABLE 3:

TABLE 3

| ASPHERIC CURV | K | A | B | C | D |
|---|---|---|---|---|---|
| A(1) | 0.11547998 | −0.490501 | −1.05844E − 04 | 1.46165E − 06 | −3.04986E − 07 | 1.34509E − 08 |
| A(2) | 0.14467090 | 0.000000 | −1.85866E − 03 | 3.09600E − 04 | −1.73512E − 04 | 4.15521E − 05 |
| A(3) | −9.03234940 | 0.000000 | 6.89014E − 03 | −1.90051E − 03 | −2.28912E − 02 | 2.59118E − 02 |
| A(4) | 0.11547998 | −0.490502 | −1.05844E − 04 | 1.46165E − 06 | −3.04986E − 07 | 1.34508E − 08 |
| A(5) | −0.45080175 | 0.000000 | −1.35500E − 02 | −2.15100E − 03 | 3.15000E − 03 | −1.67300E − 05 |
| A(6) | 0.14467090 | 0.000000 | −1.85866E − 03 | 3.09600E − 04 | −1.73512E − 04 | 4.15521E − 05 |
| A(7) | 0.80443404 | 0.000000 | −1.51400E − 02 | −7.57800E − 03 | −2.44100E − 03 | −4.90900E − 03 |
| A(8) | −0.03234940 | 0.000000 | 6.89014E − 03 | −1.90051E − 03 | −2.28912E − 02 | 2.59118E − 02 |

TABLE 4 and TABLE 5 are listings of the infinite for the NFOV configuration and the WFOV configuration respectfully.

TABLE 4

| EFL | = | −13.7541 |
| BFL | = | 1.8728 |
| FFL | = | −100.9764 |
| F/NO | = | −2.5007 |
| IMAGE DIST | = | 1.8750 |
| OAL | = | 9.2998 |
| PARAXIAL IMAGE HT |  |  |
| SEMI-FIELD ANGLE | = | 1.8000 |
| ENTR PUPIL DIAMETER | = | 5.5000 |
| DISTANCE | = | 0.0362 |
| EXIT PUPIL DIAMETER | = | 0.7489 |
| DISTANCE | = | 0.0000 |

TABLE 5

| EFL | = | −3.6696 |
| BFL | = | 1.8725 |
| FFL | = | −3.9802 |
| F/NO | = | −2.4464 |
| IMAGE DIST | = | 1.8750 |
| OAL | = | 9.2998 |
| PARAXIAL IMAGE HT | = | 0.2437 |
| SEMI-FIELD ANGLE | = | 3.8000 |
| ENTR PUPIL DIAMETER | = | 1.5000 |
| DISTANCE | = | 3.2113 |
| EXIT PUPIL DIAMETER | = | 0.7654 |
| DISTANCE | = | 0.0000 |

In TABLE 4 and TABLE 5, the FFL is measured from the first surface while BFL is measured from the last surface.

The Afocal is shown to have near-diffraction limited image quality in both fields of view. The intermediate image also has reasonably good focus spot quality and is suitable for use with optical power limiting devices. The lenses are made of Gallium Arsenide (GaAs) and Zinc Sulfide (ZnS), which do not suffer transmission losses at temperatures over 100° C. and undergo shifts in index of refraction less than one-third than that of Germanium. Both ZnS and GaAs are insoluble in water and provide the hardness required for military environments The Afocal optics are designed for minimal performance degradation at temperatures ranging from −46° C. to +80° C., and is thus considered to be "athermalized".

The Afocal may be switched between two different fields of view by flipping in or out three wide field lenses. For military Second Generation FLIR applications, a scanner could be located in the exit pupil and would scan the horizontal field of view through imaging optics onto a cold shielded focal plane array. For military FLIR (Forward Looking Infra-Red) sensor applications, a scanner could be located in the exit pupil and would scan the horizontal field of view through imaging optics onto a cold shielded focal plane array. The Afocal optics are designed for minimal performance degradation at temperatures ranging from −50° C. to +100° C. This is achieved by eliminating the use of Germanium as a lens material. The intermediate image plane between the Afocal's focusing "objective" and collimating "eyepiece" sections can be used with optical power limiting devices which require high energy gain in small focus spot sizes.

In the Narrow FOV, the Afocal has 7.3× magnifying power, a 5.5" entrance pupil diameter, and a 0.75" diameter exit pupil wherein a scanner may be located. The NFOV configuration provides a minimum 1.8° circular FOV. With the addition of the Wide FOV lenses, the Afocal has a magnification ratio of about 2×, an entrance pupil diameter of 1.5", and maintains an exit pupil diameter of 0.75". The WFOV configuration provides a minimum 3.8° circular FOV. The WFOV lenses are inserted or removed by an electronically controlled mechanism (not part of this invention). The addition of the WFOV lenses requires no compensatory motion of any of the NFOV lenses or position of a scanner within the exit pupil. All lens materials are designed for high transmission in the 8–12 micron spectral region.

While this invention has been described in terms of preferred embodiment consisting of the disclosed assembly, those skilled in the art will recognize that the invention can be practiced with modification within the spirit and scope of the appended claims.

Having thus described my invention, what I claim as new and desire to secure by Letters Patent is as follows:

1. An infrared (IR) afocal lens assembly for providing an observed magnified IR image scene with a field of view and a substantially less temperature dependent performance, the IR afocal lens assembly comprising:

a collecting lens on an optical axis for collecting IR input light, said collecting lens further comprising a GaAs meniscus lens;

a focusing lens subassembly on the optical axis after said GaAs meniscus for providing focus, said focusing lens assembly further including one doublet comprising a focusing single GaAs lens and one focusing single ZnS lens;

an intermediate focal plane on the optical axis after said focusing lens subassembly, said intermediate focal plane having an intermediate focus;

an eyepiece lens subassembly on the optical axis after said intermediate focal plane for collimating the intermediate focus and providing an external exit pupil, said eyepiece lens subassembly further including one eyepiece single GaAs lens and one doublet comprising a eyepiece single ZnS lens and one eyepiece single GaAs lens;

an aperture stop on the optical axis which defines an exit pupil of the IR afocal assembly, whereby substantially no change in index of refraction and absorption occurs with increase in lens temperatures up to approximately 100 degrees Celsius, and such that a narrow field of view (NFOV) of an IR image is observed magnified through the IR afocal lens assembly.

2. The IR afocal lens assembly of claim 1 further including an optical magnification of 7.3×.

3. The IR afocal lens assembly of claim 1 further including a minimum circular field of view of approximately 3.6 degrees.

4. The infrared (IR) afocal lens assembly of claim 1 further including a wide field of view (WFOV) lens subassembly on the optical axis about said focusing lens subassembly for providing a WFOV, said WFOV lens subassembly further including one doublet comprising two WFOV single GaAs lenses insertable in front of said focusing lens subassembly, and one WFOV single lens comprising a ZnS lens insertable behind said focusing lens subassembly whereby a WFOV of an IR image is observed magnified through the IR afocal lens assembly.

5. The IR afocal lens assembly of claim 4 further including an optical magnification of 2×.

6. The IR afocal lens assembly of claim 4 further including a minimum circular field of view of approximately 7.6 degrees.

* * * * *